（12）United States Patent
Okamoto et al.

(10) Patent No.: US 7,287,618 B2
(45) Date of Patent: Oct. 30, 2007

(54) COLLISION OBJECT PROTECTION ASSEMBLY

(75) Inventors: Yutaka Okamoto, Wako (JP); Yuji Kikuchi, Wako (JP); Kazutada Sasaki, Wako (JP); Ken Nakane, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/459,183

(22) Filed: Jul. 21, 2006

(65) Prior Publication Data

US 2007/0023222 A1 Feb. 1, 2007

(30) Foreign Application Priority Data

Jul. 26, 2005 (JP) .............................. 2005-216311
Sep. 26, 2005 (JP) .............................. 2005-277218

(51) Int. Cl.
B60R 21/34 (2006.01)
B60R 21/20 (2006.01)

(52) U.S. Cl. .................................. 180/274; 280/728.3

(58) Field of Classification Search ............... 180/271, 180/274; 296/193.11, 193.12, 187.04; 280/730.1, 280/728.3

See application file for complete search history.

(56) References Cited

U.S. PATENT DOCUMENTS 5,051,725 A * 9/1991 Caccitolo ................ 340/571
5,411,288 A * 5/1995 Steffens, Jr. ............. 280/728.3
5,588,669 A * 12/1996 Leonard et al. .......... 280/728.3
6,212,456 B1 * 4/2001 Stride .......................... 701/45
6,460,880 B1 * 10/2002 Gallagher et al. ........... 280/732
6,467,563 B1 * 10/2002 Ryan et al. ................. 180/274
6,497,302 B2 * 12/2002 Ryan ......................... 180/274
6,554,695 B2 * 4/2003 Elliot ......................... 454/139
7,174,985 B2 * 2/2007 Sawa et al. ................. 180/274
7,211,752 B2 * 5/2007 Okamoto et al. ..... 200/61.58 R
2003/0042714 A1 * 3/2003 Sawa ....................... 280/730.1
2003/0062208 A1 * 4/2003 Hamada et al. ............. 180/274
2003/0159875 A1 * 8/2003 Sato et al. .................. 180/274
2004/0011581 A1 * 1/2004 Takimoto .................... 180/274
2006/0042854 A1 * 3/2006 Sasaki et al. ............... 180/274

FOREIGN PATENT DOCUMENTS

JP 2003-252140 9/2003

* cited by examiner

Primary Examiner—Christopher P. Ellis
Assistant Examiner—Joseph Rocca
(74) Attorney, Agent, or Firm—Rankin, Hill, Porter & Clark LLP (57) ABSTRACT

A collision object protection assembly inflates and expands an air bag on a vehicle if a collision with the vehicle is detected or predicted. The collision object protection assembly includes a retainer positioned in a space between a bonnet hood and a front window glass of the vehicle and accommodating the air bag, and a cowl top arranged around the retainer to close the space between the bonnet hood and the front window glass. The retainer has an upper opening to be covered by a lid member. The lid member is a separate member from the cowl top.

11 Claims, 7 Drawing Sheets

COLLISION OBJECT PROTECTION ASSEMBLY

CROSS REFERENCE TO RELATED APPLICATIONS

This application claims the foreign priority benefit under Title 35, United States Code, §119(a)-(d) of Japanese Patent Application Nos. 2005-216311 and 2005-277218, filed on Jul. 26 and Sep. 26, 2005 in the Japan Patent Office, the disclosures of which are herein incorporated by reference in its entirety.

BACKGROUND OF THE INVENTION

The present invention relates to a collision object protection assembly, which absorbs an impact upon collision of a vehicle with a collision object, such as a pedestrian, and protects the collision object.

For example, Japanese Laid-open Patent Application No. 2003-252140 (paragraphs [0006] and FIG. 4) discloses a collision object protection assembly which inflates and expands an air bag on a vehicle if a collision with the vehicle is detected or predicted, so that an impact force applied to the collision object is absorbed and relieved. This collision object protection assembly includes a cowl top arranged between a vehicular bonnet hood (hereinafter also referred to as a hood for simplicity) and a front window glass, and a retainer accommodating an air bag and positioned below the cowl top so that an upper opening of the retainer is covered by the cowl top.

This collision object protection assembly operates, if a collision with the vehicle is detected or predicted, such that an expansion force of the air bag causes part of the cowl top to be opened in the forward or rearward direction to thereby inflate and expand the air bag on the vehicle.

However, the upper opening of the retainer is covered and closed by the cowl top in the aforementioned conventional collision object protection assembly, and so the inside of the retainer is exposed during the manufacturing process of the vehicle, particularly during the time after the retainer is assembled to the vehicle and before the cowl top is mounted. This allows water, chemicals, foreign objects, and the like to enter the inside of the retainer, which leads to a deterioration of the air bag or the inflator and an inflation and expansion error of the air bag.

Further, when the cowl top is assembled with respect to the retainer, it is necessary to precisely adjust the positions of the retainer and the cowl top such that the upper opening of the retainer is closed. However, because the retainer and the cowl top are separately assembled with the vehicle, positioning of the retainer and the cowl top becomes difficult, heading to a time-consuming assembling operation.

Furthermore, the cowl top is required to have sufficient flexibility so that part of the cowl top is reliably opened by the expansion force of the air bag. Therefore, the cowl top has to be made of an expensive material which prevents loss of its flexibility even at low temperatures, which disadvantageously leads to an increased manufacturing cost of the cowl top.

In view of the above, the present invention seeks to provide a collision object protection assembly, which prevents water, foreign objects, and the like from entering the inside of the retainer, and which enables easy assembling of the retainer and the cowl top, and further which decreases the manufacturing cost of the cowl top.

SUMMARY OF THE INVENTION

It is a first aspect of the present invention to provide a collision object protection assembly, which inflates and expands an air bag on a vehicle when a collision with the vehicle is detected or predicted. The collision object protection assembly includes a retainer positioned in a space between a bonnet hood and a front window glass of the vehicle and accommodating the air bag, and a cowl top arranged around the retainer to close the space between the bonnet hood and the front window glass. An upper opening of the retainer is covered by a lid member, which is a separate member from the cowl top.

With this configuration of the collision object protection assembly, the cowl top is arranged around the retainer in which is accommodated the air bag so as to close the space between the bonnet hood and the front window glass, and the upper opening of the retainer is covered by a lid member, which is a separate member from the cowl top. This makes it possible to handle the retainer as a single part of which inside portion is sealed. Therefore, even in a case in which the cowl top is not assembled during the manufacturing process of the vehicle, the inside of the retainer is not exposed, and it is possible to prevent water, foreign objects, and the like from entering into the inside of the retainer, which enables a reliable operation of the air bag.

Further, it is not necessary to cover the upper opening of the retainer by the cowl top, and thus no fine adjustment of the positions between the retainer and the cowl top is required upon assembling the retainer and the cowl top to the vehicle. Therefore, assembling the retainer and the cowl top is readily performed.

Further, the air bag inflates and expands while opening the lid member fixed to the retainer. Because inflation and expansion of the air bag is performed without deforming the cowl top, it is not necessary to form the cowl top with an expensive material, which preserves sufficient flexibility at lower temperatures, thereby decreasing the manufacturing cost of the cowl top.

According to the aforementioned collision object protection assembly, the lid member may be divided into a plurality of pieces in a width direction of the vehicle.

With this configuration of the collision object protection assembly, the lid member covering the upper opening of the retainer is divided into a plurality of pieces in the width direction of the vehicle, so that upon inflation and expansion of the air bag, the lid member is opened with it being divided into a plurality of pieces. Because the lid member is readily opened, a smooth inflation and expansion of the air bag is performed.

Boundary lines or grooves may appear on the upper surface of the lid member and at parts where the lid member is divided in the width direction of the vehicle. However, the cowl top is arranged around the retainer, and at first glance the retainer looks as if it is a part of the cowl top. Therefore, the boundary grooves of the lid member also look as if they are part of the design of the cowl top. Further, because the cowl top is usually black in color, the boundary grooves of the lid member becomes less conspicuous if the lid member is also black in color.

According to the aforementioned collision object protection assembly, the lid member may be divided into a plurality of divided lid members arranged in line in a width direction of the vehicle, and adjacent side end portions of the divided lid members may be overlapped is each other.

With this configuration of the collision object protection assembly, the lid member is divided into a plurality of divided lid members arranged in line in the width direction of the vehicle and adjacent side end portions of the divided lid members are overlapped each other, so that the inside of the retainer is not exposed to view from the boundary grooves of the divided lid members. Therefore, the collision object protection assembly reliably prevents water, foreign objects, and the like from entering the inside of the retainer through the boundary grooves.

According to the aforementioned collision object protection assembly, the lid member (lid members) may be connected to the retainer through a connecting member extendable toward an outside of the vehicle.

With this configuration of the collision object protection assembly, each lid member is connected to the retainer through the connecting member extendable toward the outside of the vehicle, so that when the lid member is opened by an expansion force of the air bag, the connecting member extends by the displacement of the lid member to thereby increase the displacement amount of the lid member. This enables the lid member(s) to be opened while the lid member(s) superposing on the hood of the vehicle. Therefore, without being affected by the open lid member(s), it is possible to inflate and expand the air bag to an extensive range on the vehicle while the air bag rides on the vehicle.

According to the aforementioned collision object protection assembly, a cover member may be attached to the retainer at a portion visible from an outside of the vehicle.

The retainer is usually made of metal, and if the cover member is attached to the retainer at a portion visible from the outside of the vehicle, the appearance of the vehicle will not be impaired.

According to the aforementioned collision object protection assembly, the retainer may be provided with a ventilation passage having a ventilation opening at a front side of the vehicle, and the ventilation passage may be in communication with a flow passage directed to an air conditioner.

With this configuration of the collision object protection assembly, the ventilation opening is arranged at a front side of the vehicle and the retainer is provided with a ventilation passage, which is in communication with the flow passage directed to the air conditioner. Therefore, even if the retainer extends in the width direction of the vehicle, air is taken in from the front side of the vehicle and fed to the interior of the vehicle behind the retainer.

According to the aforementioned collision object protection assembly, an air bag device may be fixed to a dash upper. Further, the dash upper may be provided with a cross beam and the air bag device may be fixed to the cross beam.

Other features and advantages of the present invention will be apparent from the following description.

BRIEF DESCRIPTION OF THE DRAWINGS

The aspects of the present invention will become more apparent by describing in detail illustrative, non-limiting embodiment thereof with reference to the accompanying drawings, in which.

DESCRIPTION OF THE PREFERRED EMBODIMENTS

Embodiments of the present invention will be described, if necessary, with reference to the accompanying drawings.

According to this preferred embodiment, a collision object protection assembly will be described as an example that is mounted on a front part of a vehicle, so that when the vehicle such as an automobile collides with an object (collision object) during the running of the vehicle and then the collision object is involved in a secondary collision with it being hit by the upper surface of the front part of the vehicle, the collision object protection assembly absorbs and relieves an impact force applied to the collision object.

Figure 1A:
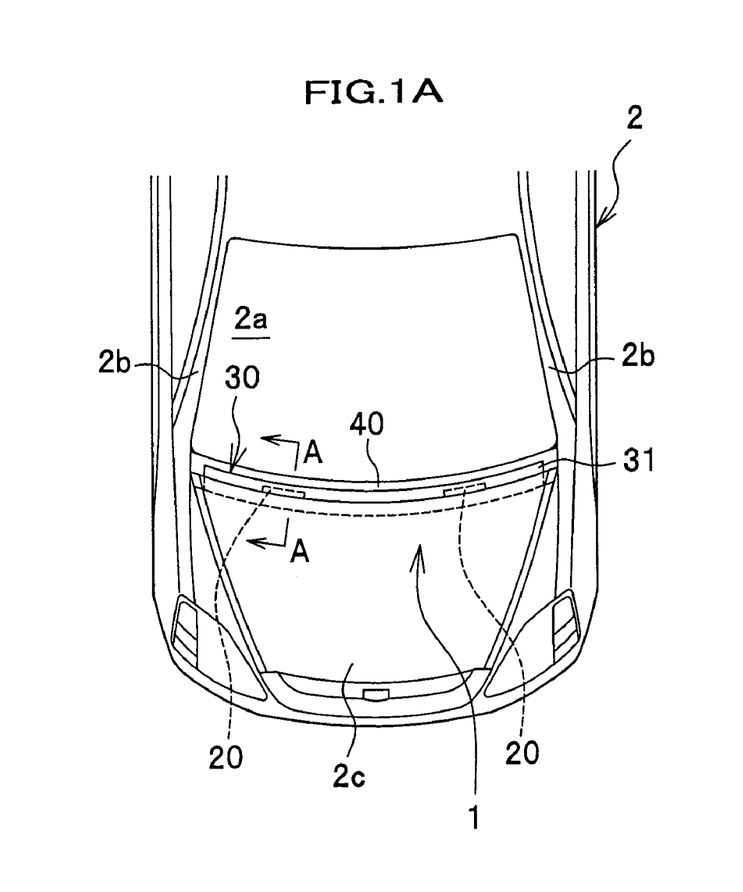
FIG. 1A is a top view of a collision object protection assembly according to one embodiment of the present invention, in which the air bag is not inflated.
Figure 1B:
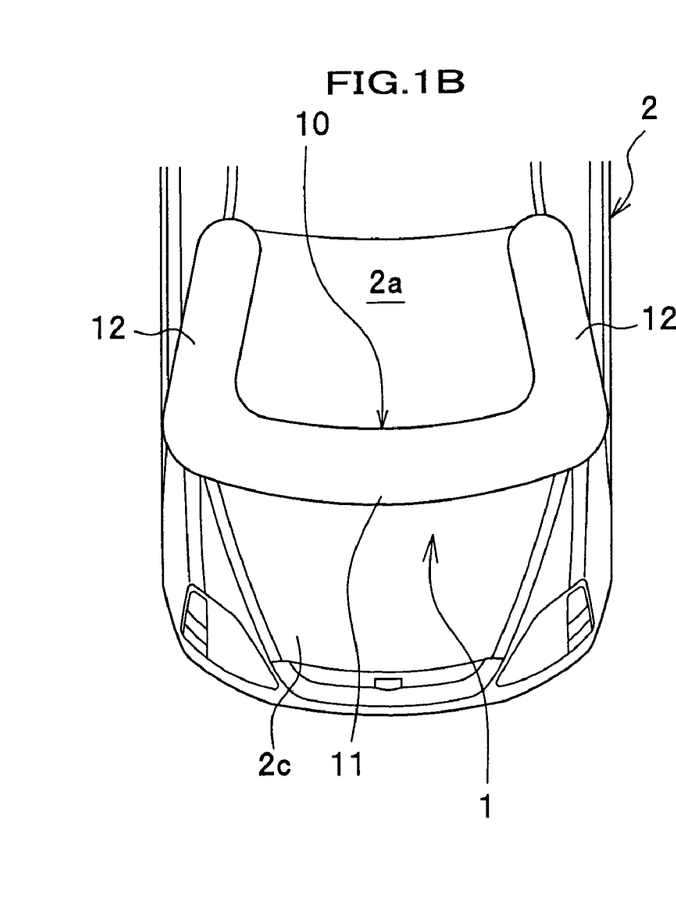
FIG. 1B is a top view of the collision object protection assembly according to this embodiment, in which the air bag has been inflated and expanded.

A collision object protection assembly 1 as shown in FIG. 1 includes a collision detection device (not shown) which detects or predicts a collision of a vehicle 2 with a collision object such as a pedestrian, and an air bag 10 which is inflated and expanded on the vehicle 2 when the collision detection device detects or predicts a collision with the vehicle 2.

The collision detection device includes an ECU (Electronic Control Unit) which detects or predicts a collision of the vehicle 2 to a collision object based on a signal from a sensor (not shown) or radar (not shown) mounted on the vehicle 2. The collision detection device operates two inflators 20, 20 so as to generate gas and to inflate and expand the air bag 10 when it detects or predicts a collision with the vehicle 2. The collision detection device is configured using a known device, and the configuration thereof is not limited to a specific one.

As shown in FIG. 1B, the air bag 10 is a bag member having a tubular cross section. The air bag 10 comprises a main body portion 11 which inflates and expands along a lower part of the front window glass 2a of the vehicle 2, and a pair of pillar portions 12, 12 which inflates and expands along the front pillars 2b, 2b of the vehicle 2 as illustrated in FIG. 1A.

Figure 6:
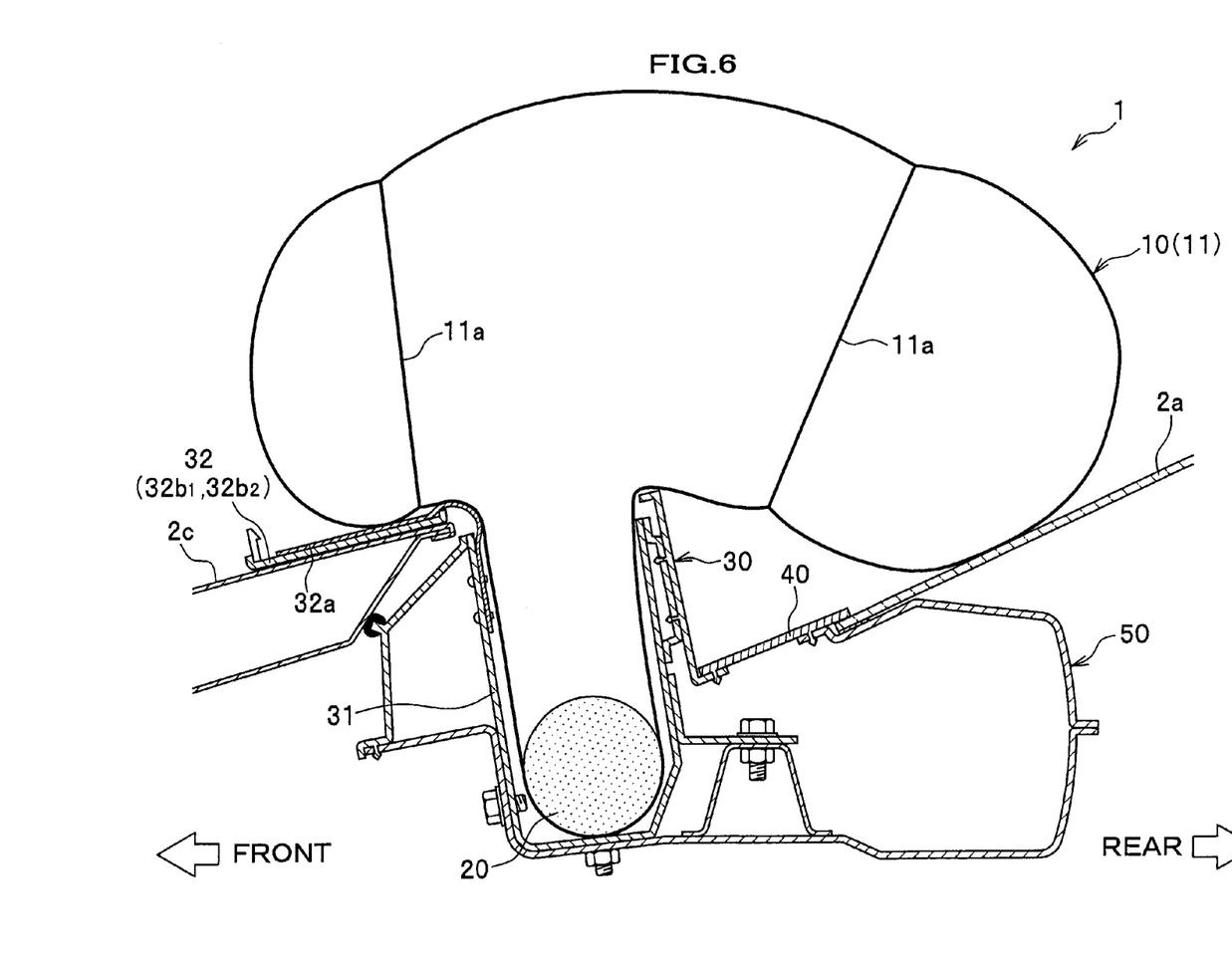
FIG. 6 is a side sectional view of the collision object protection assembly, in which the air bag has been inflated and exploded.

As shown in FIG. 6, extending longitudinally of the interior of the air bag 10 along the main body portion 11 or the pillar portions 12, 12 are tethers 11a, 11a connecting the upper and lower surfaces of the air bag 10. Because of the tethers 11a, 11a, when the air bag 10 inflates and expands, dent portions are formed on an area of the air bag 10 riding on the upper surface of the vehicle 2. Therefore, the air bag 10 inflates and expands to have a wider section in its axial direction. Because the air bag 10 expands along the upper surface of the vehicle 2, the width of the area where the air bag 10 rides on the vehicle 2 becomes wider and a deviation of the whole air bag 10 is prevented.

Figure 3:
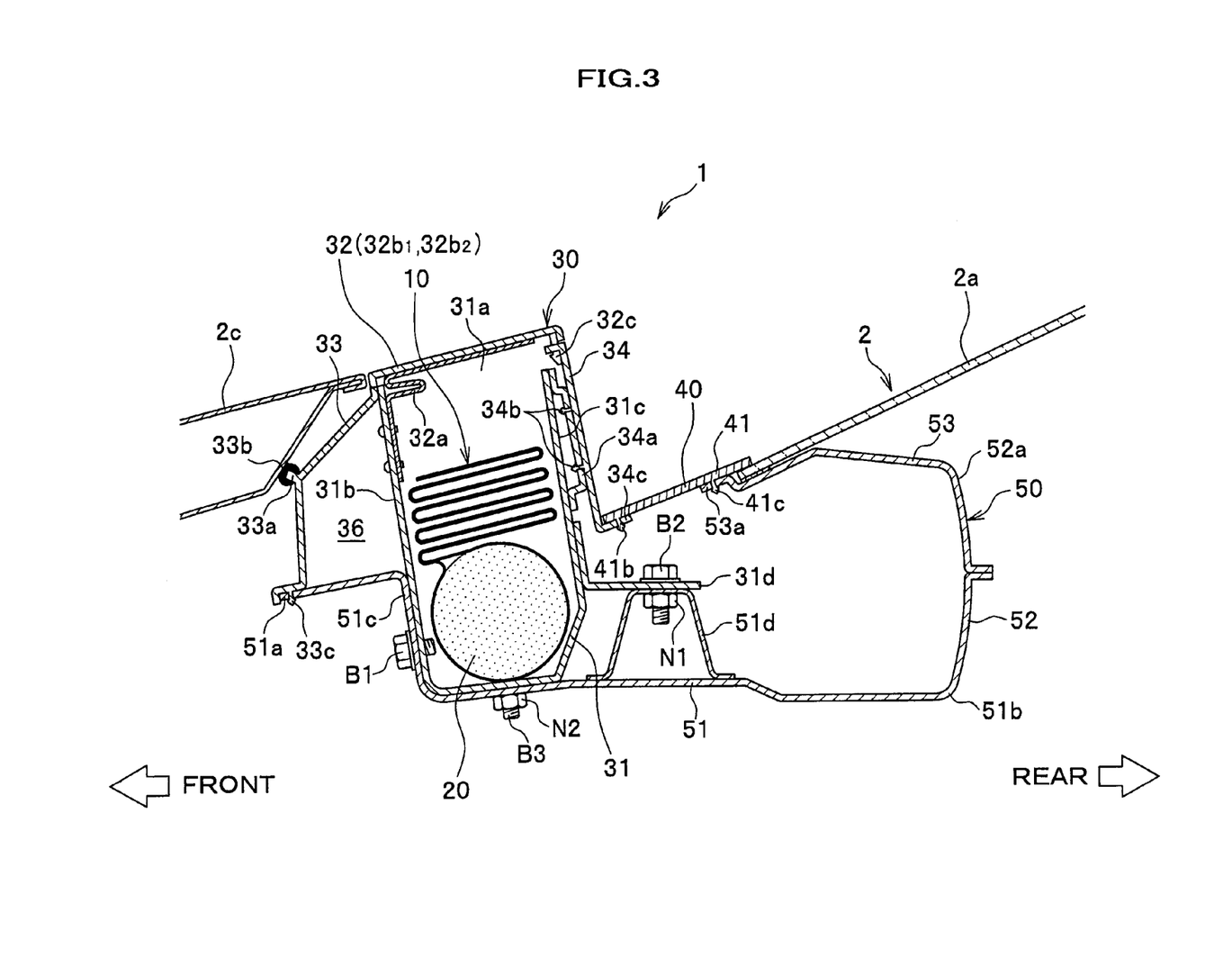
FIG. 3 is a sectional view taken along the line A-A of FIG. 1A and illustrating the collision object protection assembly.

As best seen in FIG. 3, the air bag 10 is folded and accommodated, before inflation and expansion, in a retainer 31 of an air bag module 30, which is provided between a hood 2c and the front window glass 2a of the vehicle 2. The retainer 31 is arranged along the rear end portion of the hood 2c, and at the rear of and at both sides of the retainer 31 are arranged a cowl top 40 for covering a space between the hood 2c and the front window glass 2a.

A dash upper 50 is provided at the rear end of the hood 2c and extending to the lower of the lower end of the front window glass 2a. The dash upper 50 extends in the width direction of the vehicle, and both side end portions of the dash upper 50 are joined with a vehicle body frame (not shown).

The dash upper 50 is made of a steel plate bent to have a substantially U-shaped side cross section. The dash upper 50 includes a lower plate 51, a rear plate 52, and an upper plate 53. The front end 51a of the lower plate 51 is positioned below the rear end portion of the hood 2c, and the rear end 51b of the lower plate 51 is positioned below the front window glass 2a.

The front end 51a of the lower plate 51 is higher than the rear end 51b, and at a portion more frontward than the center of the lower plate 51 as viewed in the front and rear direction, a step is formed by a vertical portion 51c of the lower plate 51.

The rear plate 52 extends vertically from the rear end 51b of the lower plate 51, and the upper plate 53 extends in the forward direction from the upper end 52a of the rear plate 52.

Further, a reinforcement cross beam 51d extends in the width direction of the vehicle at the center portion of the lower plate 51 and on the upper surface of the lower plate 51. The cross beam 51d is made of a steel plate bent to have a trapezoidal side cross section. The cross beam 51d is joined to the upper surface of the lower plate 51 at the front end and the rear end of the cross beam 51d.

Figure 2:
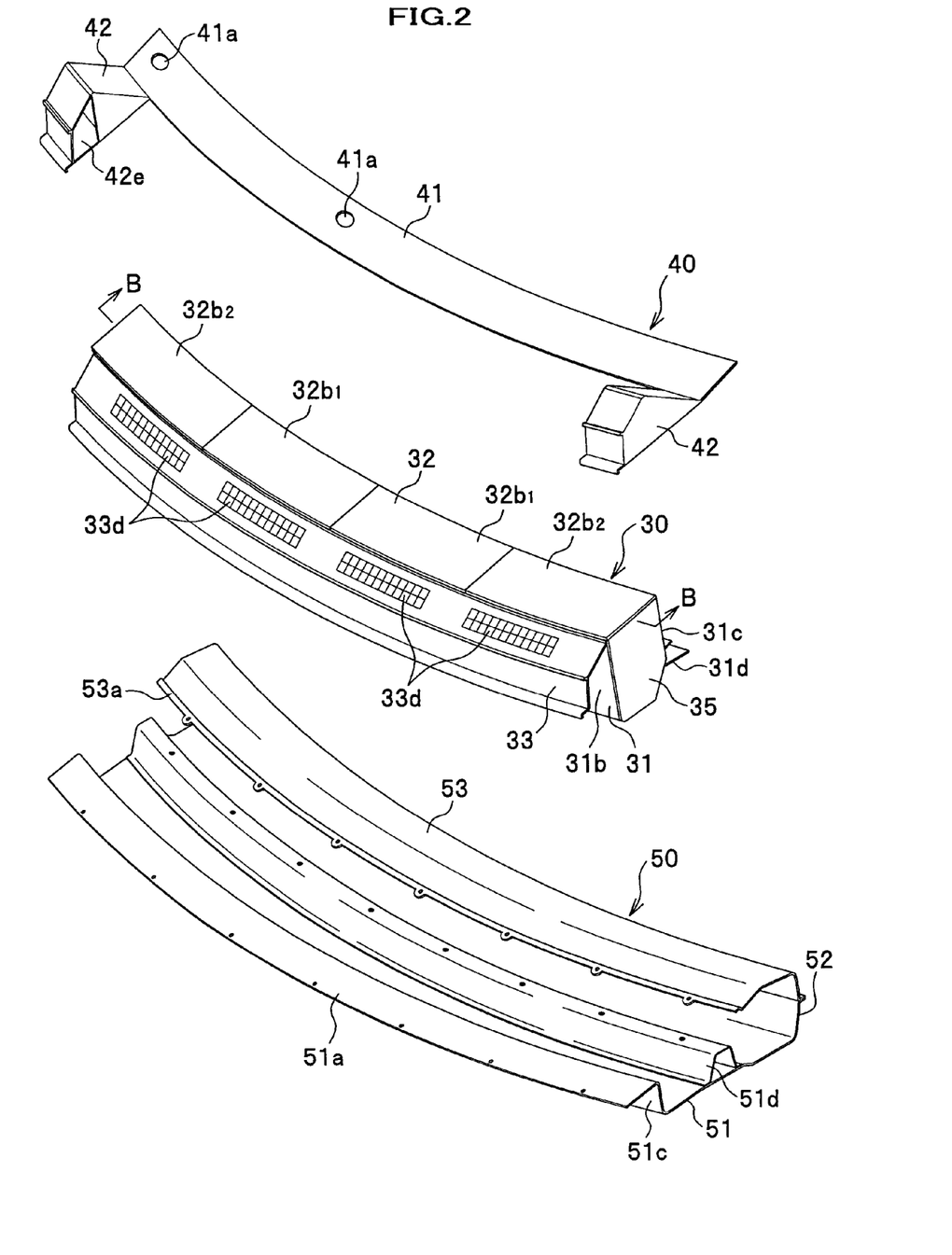
FIG. 2 is an exploded perspective view of the collision object protection assembly according to this embodiment.

As seen in FIGS. 2 and 3, the air bag module 30 extends in the width direction of the vehicle along the rear end portion of the hood 2c, and consists of a retainer 31 in the form of a box-like container accommodating the air bag 10 and the inflators 20, 20, a front cover 33 attached to the front surface 31b of the retainer 31, a rear cover 34 attached to the rear surface 31c of the retainer 31, and side covers 35, 35 attached to the both side surfaces of the retainer 31.

The retainer 31 has an upper opening 31a. The upper opening 31a is covered by a lid 32 as a lid member so that the inside of the retainer 31 is sealed.

The retainer 31 has female screw holes at a lower part of the front surface 31b in positions such that when the retainer 31 is overlapped the inner surface of the vertical portion 51c of the lower plate 51, the female screw holes are in conformity with through holes formed in the vertical portion 51c. Therefore, inserting and screwing bolts B1 from outside the through holes fixes or attaches the retainer 31 and the lower plate 51 together.

An attachment plate 31d is fixed to the rear surface 31c of the retainer 31. The attachment plate 31d is bent to have an L-shaped form extending toward the rear direction. Rear end part of the attachment plate 31d overlaps the cross beam 51d, and they are fixed together by inserting bolts B2 from above the attachment plate 31d into through holes formed in the attachment plate 31d and the cross beam 51d and screwing the bolts B2 into nuts N1 at the reverse surface of the cross beam 51d.

Accordingly, the retainer 31 is fixed to the lower plate 51 of the dash upper 50. Attachment structures between the retainer 31 and the dash upper 50, such as the bolts B1, B2 and nuts N1, are arranged at a predetermined space interval in the width direction of the vehicle.

Inflators 20, 20 are accommodated at the bottom of the retainer 31, and the air bag 10 is folded and positioned above the inflators 20.

A band member (not shown) wraps around the inflator 20 and the air bag 10. The band member is provided with a bolt B3, which is inserted into through holes formed in the retainer 31 and the lower plate 51 of the dash upper 50 and screwed into a nut N2 at the lower surface of the lower plate 51 to fix the air bag 10 and the inflator 20 together within the retainer 31.

According to this preferred embodiment, two inflators 20, 20 are arranged in the retainer 31 of the air bag module 30 (FIG. 1A), and each of the inflators 20 is fixed as above within the retainer 31.

Figure 5:
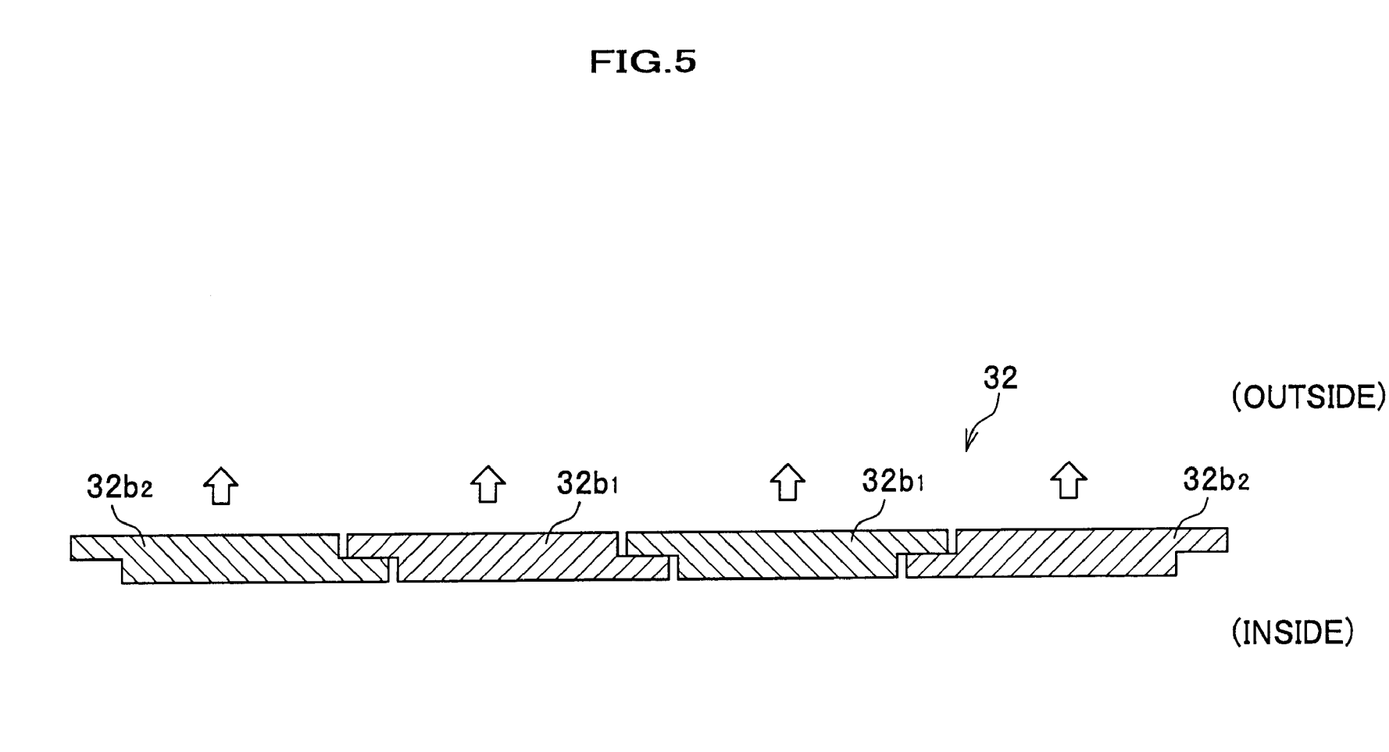
FIG. 5 is a sectional view taken along the line B-B of FIG. 2.

The lid 32 is a plate-like member for covering the upper opening 31a of the retainer 31 and sealing the inside of the retainer 31. According to this embodiment, the lid 32 is divided in the width direction of the vehicle into four divided lids $32b_1$, $32b_2$ (divided lid members defined in the claims). As shown in FIG. 5, side end portions of each divided lid $32b_1$, $32b_2$ are cut out at the upper half or the lower half so that when the divided lids $32b_1$, $32b_2$ are arranged in line in the width direction of the vehicle, adjacent side end portions of the divided lids $32b_1$, $32b_2$ are overlapped each other. Of these four divided lids $32b_1$, $32b_2$, the two divided lids $32b_1$, $32b_1$ arranged in the center are overlapped at the side end portions onto the side end portions of the other two divided lids $32b_2$, $32b_1$ arranged on both sides.

As seen in FIG. 3, a pin member 32c of a fit-in clip extends downwardly at the rear end of each divided lid $32b_1$, $32b_2$. The distal end of the pin member 32c is fitted into and engaged with a through hole formed in the upper end of the rear cover 34.

As best seen in FIG. 3, a hinge member 32a (connecting member defined in the claims) in the shape of an L-shaped plate member is attached to the divided lid $32b_1$, $32b_2$ at one end thereof, and the other end of the hinge member 32a is attached to a front inner surface of the retainer 31. The mid portion of the hinge member 32a is folded and allowed to extend toward the outside of the vehicle.

When the air bag 10 inflates and expands as illustrated in FIG. 6, the expansion force of the air bag 10 opens each of the divided lids $32b_1$, $32b_2$ toward the outside of the vehicle. The hinge member 32a then extends in accordance with the displacement of the divided lid, allowing each of the divided lids $32b_1$, $32b_2$ to be opened toward the front side of the vehicle.

In order to reliably open the divided lids $32b_1$, $32b_2$ without scattering the divided lids, the divided lids $32b_1$, $32b_2$ are preferably made of a material having a sufficient flexibility. For this reason, each of the divided lids $32b_1$, $32b_2$ is made of a material which does not lose its flexibility even at low temperatures in a cold district or the like. For example, a material having a lower brittle temperature, such as fluororesin or polyethylene is used.

As shown in FIGS. 2 and 3, the front cover 33 extends along the front surface 31b of the retainer 31. The upper end of the front cover 33 is joined with the upper end of the front surface 31b of the retainer 31.

The front cover 33 tilts downwardly from the upper end toward the front side of the vehicle in such a manner as to extend inward below the rear end of the hood 2c, and is bent at a mid portion thereof so as to extend downwardly in the vertical direction.

Formed at the front surface of this bent portion is a protrusion 33a extending in the width direction of the vehicle. As seen in FIG. 3, a seal member 33b made of rubber is fitted onto the protrusion 33a over the whole width of the protrusion 33a. The seal member 33b abuts against the lower surface of the hood 2c to thereby prevent water from entering into a space between the air bag module 30 and the hood 2c.

Pin members 33c of a fit-in clip extend downwardly from the lower end of the front cover 33, so that fitting the pin members 33c into corresponding through holes formed in the front end portion 51a of the lower plate 51 of the dash upper 50 makes the lower end of the front cover 33 to be fixed to the lower plate 51 of the dash upper 50. The plurality of pin members 33c and corresponding through holes are provided at a predetermined spaced interval in the width direction of the vehicle.

Accordingly, a ventilation passage 36 surrounded by the front cover 33, the front surface 31b of the retainer 31, and the lower plate 51 of the dash upper 50 is formed along the front surface 31b of the retainer 31 in the width direction of the vehicle.

Figure 4:
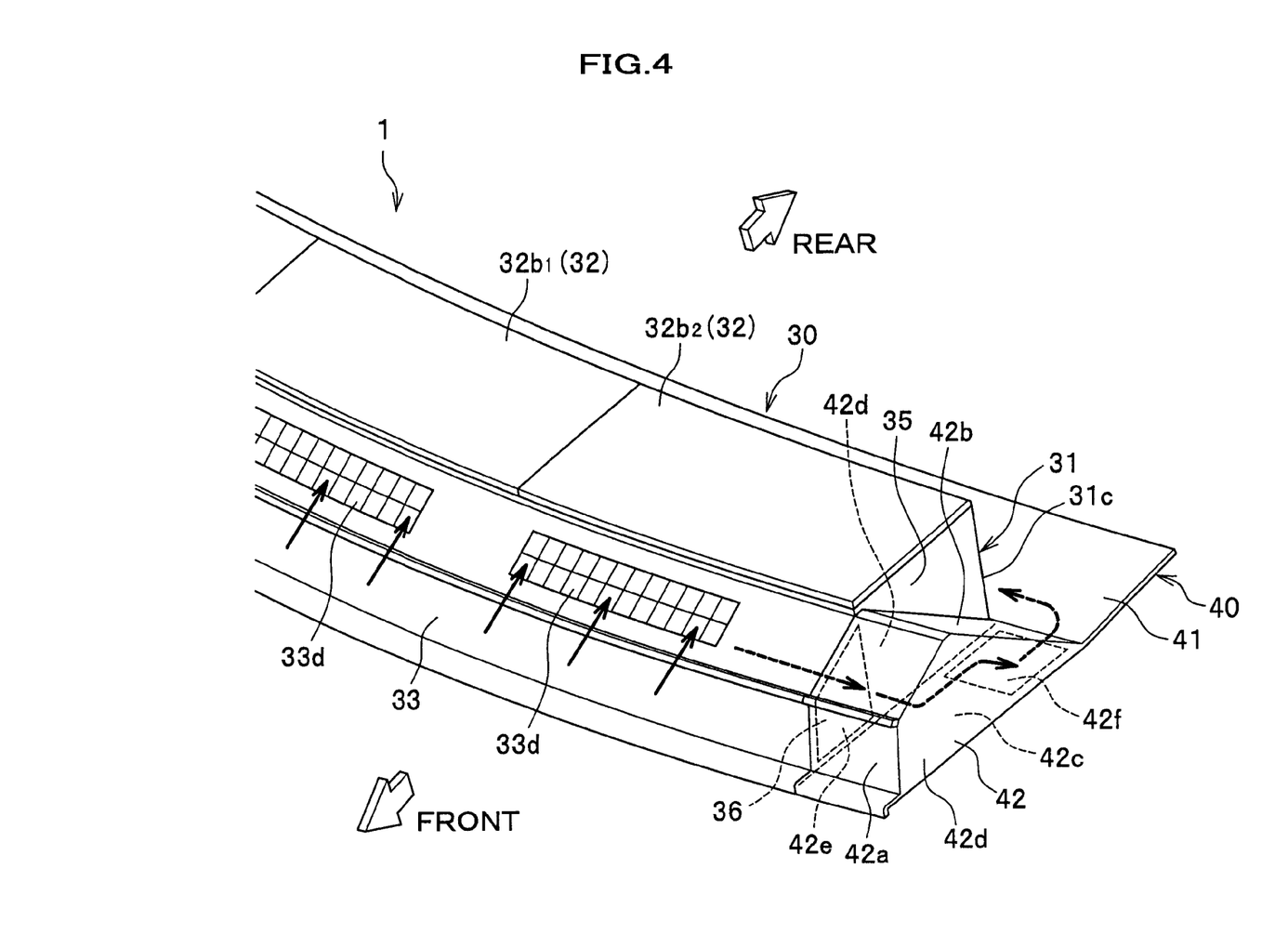
FIG. 4 is a perspective view of the collision object protection assembly illustrating a side end portion thereof.

Further, four ventilation openings 33d are formed in the upper part of the front cover 33 at a predetermined space interval in the width direction of the vehicle. As shown in FIG. 4, air at the front side of the vehicle is taken in from the inside of the hood 2c through the ventilation openings 33d and into the ventilation passage 36, and thereafter the air flows toward both sides of the ventilation passage 36.

As shown in FIG. 3, the rear cover 34 is attached to a spacer 34a which is fixed to the rear surface 31c of the retainer 31 to thereby cover the upper part of the rear surface 31c of the retainer 31. The lower end 34c of the rear cover 34 is bent to extend toward the rear direction.

Protruding forwardly from the front surface of the rear cover 34 are pin members 34b of a fit-in clip. Therefore, fitting the pin members 34b into corresponding through holes formed in the spacer 34a makes the rear cover 34 to be fixed to the spacer 34a. The plurality of pin members 34b and corresponding through holes are provided at a predetermined spaced interval in the width direction of the vehicle.

As seen in FIGS. 2 and 4, the cowl top 40 consists of a main body 41 as a horizontal plate extending along the rear surface 31c of the retainer 31, and box-like side portions 42, 42 extending from the main body 41 along the side portions of the retainer 31. Two through-openings 41a, 41a are formed in the main body 41 of the cowl top 40 for the attachment of wipers.

When the cowl top 40 is arranged behind and at both sides of the retainer 31, the space between the hood 2c and the front window glass 2a is covered by the retainer 31 and the cowl top 40 as illustrated in FIG. 3.

As best seen in FIG. 3, the main body 41 of the cowl top 40 is attached to the retainer 31 at a center portion in the height direction of the retainer 31. Pin members 41b of a fit-in clip protrude downwardly from the lower surface of the front end of the main body 41. The pin members 41b are fitted into corresponding through holes formed in the lower end 34c of the rear cover 34.

Pin members 41c of the fit-in clip also protrude downwardly from the lower surface of the rear end of the main body 41. The pin members 41c are fitted into a corresponding through hole formed in the front end 53a of the upper plate 53 of the dash upper 50.

The plurality of pin members 41b, 41c and corresponding through holes are provided at a predetermined spaced interval in the width direction of the vehicle.

The main body 41 of the cowl top 40 is thereby fixed to the retainer 31 and the dash upper 50.

As shown in FIG. 4, each side portion 42 is a hollow box member which consists of a bent plate 42a formed in flush with the front cover 33 attached to the retainer 31, a tilted plate 42b extending downwards and rearwards from the top end of the bent plate 42a and merging with the main body 41, a bottom plate 42c continuously elongating from the main body 41 and closing the bottom surface of the side portion 42, and side plates 42d, 42d for closing the side ends of the side portion 42.

The inside of the side portion 42 provides a space for introducing air from the ventilation passage 36 formed in the front surface 31b of the retainer 31 toward a flow passage for the air conditioner (not shown) arranged below the main body 41 of the cowl top 40. The side plate 42d that is positioned inward is provided with a side opening 42e communicating with the side end of the ventilation passage 36, and the bottom plate 42c is provided with a bottom opening 42f communicating with the flow passage directed to the air conditioner.

The collision object protection assembly 1 as described above has the following effects.

According to the collision object protection assembly 1, as shown in FIG. 3, the cowl top 40 is arranged around the retainer 31 in which is accommodated the air bag 10, so as to close the space between the hood 2c and the front window glass 2a, and the upper opening 31a of the retainer 31 is covered by the lid 32 which is a separate member from the cowl top 40. Therefore, it is possible to handle the retainer 31 as a single part of which inside portion is sealed. Even in a state where the cowl top 40 is not assembled during the manufacturing process of the vehicle 2, the inside of the retainer 31 is not exposed, and it is possible to prevent water, foreign objects, and the like from entering the inside of the retainer 31, enabling a reliable operation of the air bag 10.

Further, it is not necessary to cover the upper opening 31a of the retainer 31 by the cowl top 40, and thus no fine adjustment of the positions between the retainer 31 and the cowl top 40 is required upon assembling the retainer 31 and the cowl top 40 to the vehicle 2. Therefore, assembling the retainer 31 and the cowl top 40 is readily performed.

The air bag 10 inflates and expands while opening the lid 32 attached to the retainer 31. Because inflation and expansion of the air bag 10 is performed without deforming the cowl top 40, it is not necessary to form the cowl top 40 with an expensive material which preserves sufficient flexibility at lower temperatures, thereby decreasing the manufacturing cost of the cowl top 40.

Further, the lid 32 is divided into a plurality of pieces in the width direction of the vehicle, so that upon inflation and expansion of the air bag 10, the lid 32 is opened with it being divided into a plurality of pieces. Because the lid 32 is readily opened, a smooth inflation and expansion of the air bag 10 is performed.

Boundary lines or grooves may appear on the upper surface of the lid 32 and at parts where the lid 32 is divided in the width direction of the vehicle. However, the cowl top 40 is arranged around the retainer 31, and at first glance the retainer 31 looks as if it is a part of the cowl top 40. Therefore, the boundary grooves of the lid 32 also look as if they are part of the design of the cowl top 40. Further, because the cowl top 40 is usually black in color, the boundary grooves of the lid 32 becomes less conspicuous if the lid 32 is also black in color.

Further, as shown in FIG. 5, because adjacent side end portions of the divided lids 32b, 32b are overlapped each other, the inside of the retainer 31 is not exposed to view from the boundary grooves, thereby reliably preventing water, foreign objects, and the like from entering the inside of the retainer 31 through the boundary grooves.

Because the rear cover 34 and the side cover 35 (FIG. 2) are attached to the retainer 31 at a portion visible from the outside of the vehicle 2, the appearance of the vehicle 2 will not be impaired.

Further, the retainer 31 is provided with a ventilation passage 36 having the ventilation openings 33d at the front side of the vehicle, and as shown in FIG. 4, air at the front side of the vehicle 2 is fed from the ventilation passage 36 into the flow passage directed to the air conditioner via the side portions 42 of the cowl top 40. Therefore, in a case in which the retainer 31 extends in the width direction of the vehicle, it is possible to take in air from the front side of the vehicle 2 and feed the same toward the vehicle cabin positioned behind the retainer 31.

Further, as shown in FIG. 1A, when the collision detection device (not shown) detects or predicts a collision with the vehicle 2 based on a signal from the sensor (not shown) or radar (not shown) mounted on the vehicle 2, the collision detection device operates the inflators 20, 20. The air bag 10 then inflates and expands on the vehicle 2 as shown in FIG. 1B with the lid 32 (FIG. 2) being opened because of the expansion force of the air bag 10 caused by the gas generated at the inflators 20, 20.

As shown in FIG. 3, each divided lid $32b_1$, $32b_2$ of the lid 32 is attached to the retainer 31 through the hinge member 32a extendable toward the outside of the vehicle 2, so that as seen in FIG. 6, the hinge member 32a extends toward the outside of the vehicle 2, for example, in the upward direction by the displacement of the divided lids $32b_1$, $32b_2$. This enables the displacement amount of the divided lids $32b_1$, $32b_2$ to be increased further, and so the divided lids $32b_1$, $32b_2$ are opened while overlapping on top of the hood 2c. The inflating and expanding air bag 10 therefore rides on the hood 2c without being disturbed by the divided lids $32b_1$, $32b_2$ opened, leading to the inflation and expansion of the air bag 10 on an extensive range of the hood 2c.

Further, inflation and expansion of the air bag 10 is initiated from around the center part of the retainer 31, in which are provided the inflators 20, 20 (FIG. 1A), as viewed in the width direction of the vehicle. According to this embodiment such as shown in FIG. 5, of the four divided lids $32b_1$, $32b_2$, two of the middle divided lids $32b_1$, $32b_1$, ride on the other divided lids $32b_2$, $32b_2$ at the side end portions thereof, so that the two middle divided lids $32b_1$, $32b_1$, are firstly opened without being trapped by the side end portions of the other side divided lids $32b_2$, $32b_2$ and thereafter the two side divided lids $32b_2$, $32b_2$ are opened. Therefore, it is possible to perform a smooth inflation and expansion of the air bag 10.

While the present invention has been described with reference to one preferred embodiment thereof, it is to be understood that the present invention is not limited to this specific embodiment and various changes and modifications may be made without departing from the spirit of the invention. For example, instead of arranging the retainer 31 in front of the main body 41 of the cowl top 40 as illustrated in FIG. 3, the retainer 31 may be arranged behind the main body 41 of the cowl top 40. Arrangement between the retainer 31 and the cowl top 40 is not limited to the specific arrangement.

According to the above-described embodiment, the ventilation passage 36 extending in the width direction of the vehicle is provided at the retainer 31 and air is fed through the sides of the retainer 31 toward the rear side of the retainer 31. However, a ventilation passage may be provided such that air is taken in from the front side of the retainer 31 and flows below the retainer 31 toward the rear side of the retainer 31, and the configuration of the ventilation passage is not limited to specific ones.

Further, according to the above-described embodiment, as shown in FIG. 5, the lid 32 is divided into a plurality of pieces in the width direction of the vehicle and the boundary grooves appear on the upper surface of the lid 32. However, it is possible to provide a plurality of grooves in the lower surface of the lid 32 by means of laser beam machining or the like, so as to form a flat upper surface on the lid 32. When the lid 32 opens, the lid 32 is divided into a plurality of pieces at the grooves, thereby enabling a smooth opening operation of the lid 32.

As long as the lid 32 is reliably opened by the expansion of the air bag 10, the lid 32 may be formed integrally without being divided in the width direction of the vehicle.

Further, according to the above-described embodiment, as shown in FIG. 3, each of the divided lids $32b_1$, $32b_2$ is connected to the retainer 31 by the hinge member 32a, which is a plate member having a folded mid portion. However, a connecting member for connecting the divided lid $32b_1$, $32b_2$ to the retainer 31 is not limited to this hinge member 32a as long as it extends toward the outside of the vehicle. The connecting member may be made of an elastic material such as rubber.

In order to improve water sealing characteristic of adjacent divided lids $32b_1$, $32b_2$ at the boundary groove thereof, various modifications may be made as shown in FIGS. 7A to 7D. FIGS. 7A through 7D are sectional views each illustrating divided lids of a collision object protection assembly according to another embodiment together with the boundary groove of the adjacent divided lids.

Figure 7A:
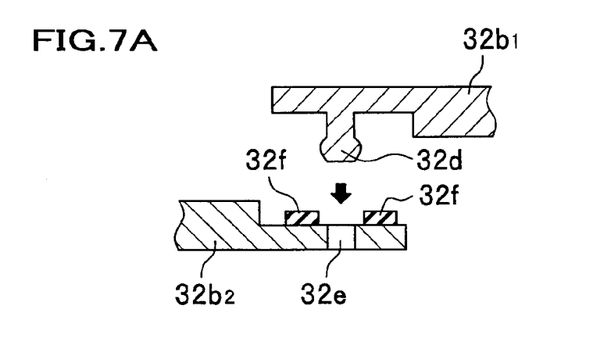
FIGS. 7A to 7D are sectional views each illustrating divided lids of a collision object protection assembly according to another embodiment together with a boundary groove of the adjacent divided lids.

An example shown in FIG. 7A is such that a pin member 32d projecting downwardly from the lower surface of a side end portion of the upper divided lid $32b_1$ is fitted into a through hole 32e formed in the side end portion of the lower divided lid $32b_2$. Water seal members 32f, 32f such as rubber members extending in the forward and rearward direction are provided between the two overlapped side end portions so as to improve water seal at the boundary groove formed between the divided lids $32b_1$, $32b_2$.

Figure 7B:
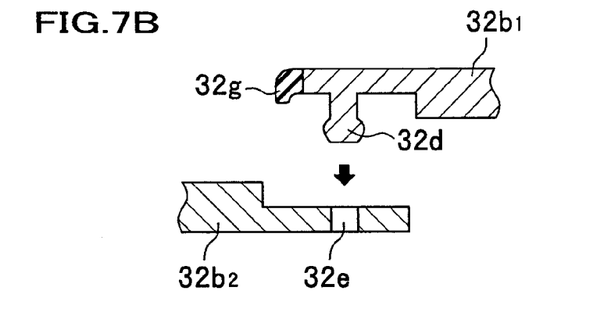

Further, as shown in FIG. 7B, a water seal member 32g such as a rubber member bent in the downward direction may be attached to the side edge of the upper divided lid $32b_1$, so that when the divided lids $32b_1$, $32b_2$ are overlapped at the side end portions, the water seal member 32g tightly contacts with the side end portion of the lower divided lid $32b_2$, thereby improving water seal at the boundary groove formed between the divided lids $32b_1$, $32b_2$.

Figure 7C:
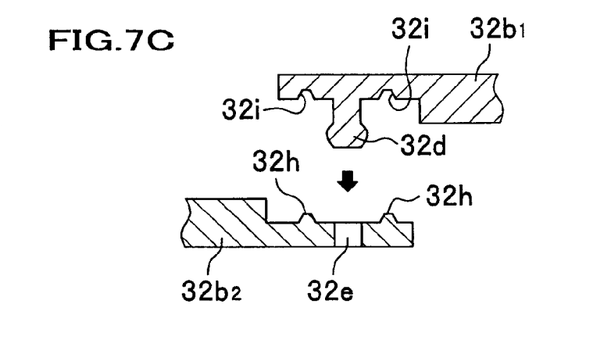

As shown in FIG. 7C, ribs 32h extending in the forward and rearward direction may be provided on the upper surface of the side end portion of the lower divided lid $32b_2$, so that when the divided lids $32b_1$, $32b_2$ are overlapped at the side end portions, the ribs 32h are fitted into corresponding grooves 32j formed in the lower surface of the side end portion of the upper divided lid $32b_1$, thereby improving water seal at the boundary groove formed between the divided lids $32b_1$, $32b_2$.

Figure 7D:
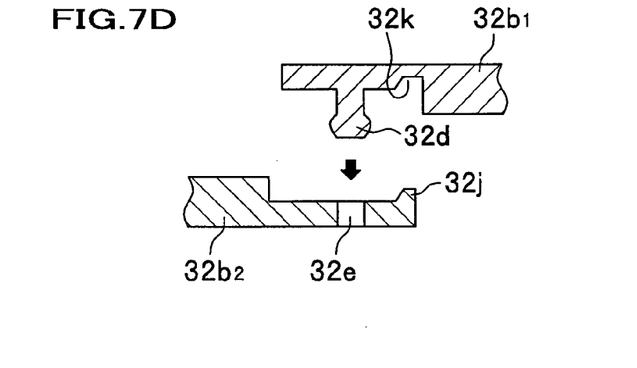

Further, as shown in FIG. 7D, the side edge 32j of the lower divided lid $32b_2$ may form a ridge portion, so that when the divided lids $32b_1$, $32b_2$ are overlapped at the side end portions, the side edge 32j is fitted to a corresponding groove 32k formed in the lower surface of the side end portion of the upper divided lid $32b_1$. This improves water seal at the boundary groove formed between the divided lids $32b_1$, $32b_2$.

What is claimed is:

1. A collision object protection assembly, which inflates and expands an air bag on a vehicle when a collision with the vehicle is detected or predicted, the collision object protection assembly comprising:
   a retainer positioned in a space between a bonnet hood and a front window glass of the vehicle and accommodating the air bag, the retainer having a front wall, a rear wall, and first and second sidewalls that cooperate to define an upper opening;
   a lid member having one side that is hingedly attached to one of the front and rear walls of the retainer and an opposite side that is releasably secured to the other of the front and rear walls of the retainer, the lid member covering the upper opening of the retainer; and
   a cowl top arranged around the retainer to close a space between the retainer and the front window glass;
   wherein, as the airbag inflates, the lid member moves to expose the retainer upper opening while the retainer and the cowl top remain stationary
   wherein the lid member is divided into a plurality of divided lid members arranged in line in a width direction of the vehicle, and wherein adjacent side end portions of the divided lid members overlap each other such that the side end portion of one divided lid member rests on top of the side end portion of an adjacent divided lid member.

2. The collision object protection assembly according to claim 1, further comprising a connecting member, said connecting member hingedly connecting the lid member to the retainer and being extendable from a position disposed within the retainer to a position outside of the retainer and outside of the vehicle.

3. The collision object protection assembly according to claim 1, further comprising a plurality of connecting members, each of said plurality of connecting members hingedly connecting one of the plurality of divided lid members to the retainer and wherein each of the connecting members is extendable from a position disposed within the retainer to a position outside of the retainer and outside of the vehicle.

4. The collision object protection assembly according to claim 1, wherein the lid member is attached to the retainer at a portion visible from outside of the vehicle.

5. The collision object protection assembly according to claim 1, wherein the retainer is provided with a ventilation passage having a ventilation opening in the front wall of the retainer at a front side the vehicle, and the ventilation passage is in communication with a flow passage directed to an air conditioner.

6. The collision object protection assembly according to claim 5, wherein the dash upper is provided with a cross beam and the air bag device is fixed to the cross beam.

7. The collision object protection assembly according to claim 1, wherein an air bag device is fixed to a dash upper.

8. The collision object protection assembly according to claim 7, wherein the retainer is made of metal and is fixed to the dash upper by bolts.

9. The collision object protection assembly according to claim 1, wherein the cowl top comprises a main body, a first side portion, and a second side portion, the main body is disposed between the retainer rear wall and the front window glass, the first side portion is laterally adjacent to the first side wall of the retainer and the cowl top second side portion is laterally adjacent to the second side wall of the retainer.

10. The collision object protection assembly according to claim 9, wherein the first and second side portions cooperate with the retainer to define a ventilation passage in communication with a flow passage directed toward an air conditioner.

11. The collision object protection assembly according to claim 1, wherein the lid member is hingedly affixed to the front wall of the retainer such that the lid member opens in a direction toward the bonnet hood and away from the cowl and front window glass when the air bag is inflated.

* * * * *